United States Patent [19]

Nakai

[11] Patent Number: 4,639,650

[45] Date of Patent: Jan. 27, 1987

[54] CONTROL SYSTEM FOR A COOLING FAN IN AN IMPACT PRINTER

[75] Inventor: Toshihiko Nakai, Tanashi, Japan

[73] Assignee: Citizen Watch Co., Ltd., Tokyo, Japan

[21] Appl. No.: 701,615

[22] Filed: Feb. 14, 1985

[30] Foreign Application Priority Data

Feb. 17, 1984 [JP] Japan .......................... 59-021623[U]

[51] Int. Cl.$^4$ .......................... G05B 5/00; B41J 19/00

[52] U.S. Cl. .......................... 318/333; 318/39; 318/334; 318/608; 400/719

[58] Field of Search ............... 318/333, 308, 314, 317, 318/341, 326, 328, 7, 595, 608, 34, 38, 39, 40, 41, 46, 49, 50, 51, 53, 66, 68, 67, 71, 77, 332, 334; 400/691, 719

[56] References Cited

U.S. PATENT DOCUMENTS

| | | | |
|---|---|---|---|
| 2,757,329 | 7/1956 | Lichtenfels | 318/333 |
| 2,790,122 | 4/1957 | Powers et al. | 318/333 X |
| 3,626,262 | 12/1971 | Kelling | 318/39 |
| 3,633,081 | 1/1972 | Weber | 318/39 |
| 3,789,279 | 1/1974 | Dempsey et al. | 318/39 |
| 3,896,359 | 7/1975 | Olander et al. | 318/334 |
| 4,097,790 | 6/1978 | Wilson | 318/334 |
| 4,160,937 | 7/1979 | Fiorini | 318/39 |
| 4,320,327 | 3/1982 | Fencl | 318/50 |
| 4,426,604 | 1/1984 | Doemen et al. | 318/334 |
| 4,450,389 | 5/1984 | Frister et al. | 318/334 X |
| 4,459,519 | 7/1984 | Erdman | 318/334 X |
| 4,478,009 | 10/1984 | Rukavina et al. | 318/608 X |
| 4,506,199 | 3/1985 | Asche | 318/334 X |

FOREIGN PATENT DOCUMENTS

| | | | |
|---|---|---|---|
| 0151583 | 11/1981 | Japan | 400/719 |
| 0164483 | 12/1981 | Japan | 400/719 |
| 0148678 | 9/1982 | Japan | 400/719 |

OTHER PUBLICATIONS

Motor ON/OFF Sensing Device by Monitoring the RF Conducted Noise by IBM Technical Disclosure Bulletin, vol. 27, No. 5, Oct. 1984.

*Primary Examiner*—William M. Shoop, Jr.
*Assistant Examiner*—Shik Luen Paul Ip
*Attorney, Agent, or Firm*—Birch, Stewart, Kolasch & Birch

[57] ABSTRACT

A control system for an impact printer having a cooling fan, in which a current for driving a printing device is detected as a voltage and the detected voltage is compared with a reference value. When the detected voltage is lower than the reference value, the current for driving the cooling fan is decreased.

3 Claims, 2 Drawing Figures

CONTROL SYSTEM FOR A COOLING FAN IN AN IMPACT PRINTER

BACKGROUND OF THE INVENTION

The present invention relates to a control system for a cooling fan in an impact printer.

An impact printer is provided with a cooling device having a fan for cooling a printing device during the printing operation. A problem exist in that the cooling fan makes a comparatively loud noise when operating.

Additionally, the rate of printing operation, that is the amount of the printing in relation to time, varies irregularly while, the printing device is uniformly cooled by the cooling fan independent of the printing rate. As a result, the printing device is uselessly over-cooled when the printing rate is low.

SUMMARY OF THE INVENTION

The object of the present invention is to provide a control system for a cooling fan in an impact printer which controls the driving voltage of the cooling fan in accordance with the printing rate of a printing device so as to decrease the noise of the cooling fan when operating.

According to the present invention, there is provided a control system for an impact printer having a printing device, a driving circuit for driving the printing device, a cooling fan, and a motor for driving the cooling fan. The control system comprises first means for detecting a current for driving the printing device and for producing an output dependent on the current, comparing circuit means for comparing the output of the first means with a reference value and producing an output signal dependent on the comparison, second means for supplying a current to the motor, third means responsive to the output of the comparing means for controlling the current for the motor so as to decrease the current when the current for the printing device decreases.

In an aspect of the present invention, the first means comprises a transformer and diode for converting the current to a voltage dependent on the current, and the second means is a circuit comprising a transformer, a rectifier and a step-down circuit.

These and other objects and features of the present invention will become more apparent from the following description with reference to the accompanying drawings.

DESCRIPTION OF THE PREFERRED EMBODIMENTS

Figure 1:
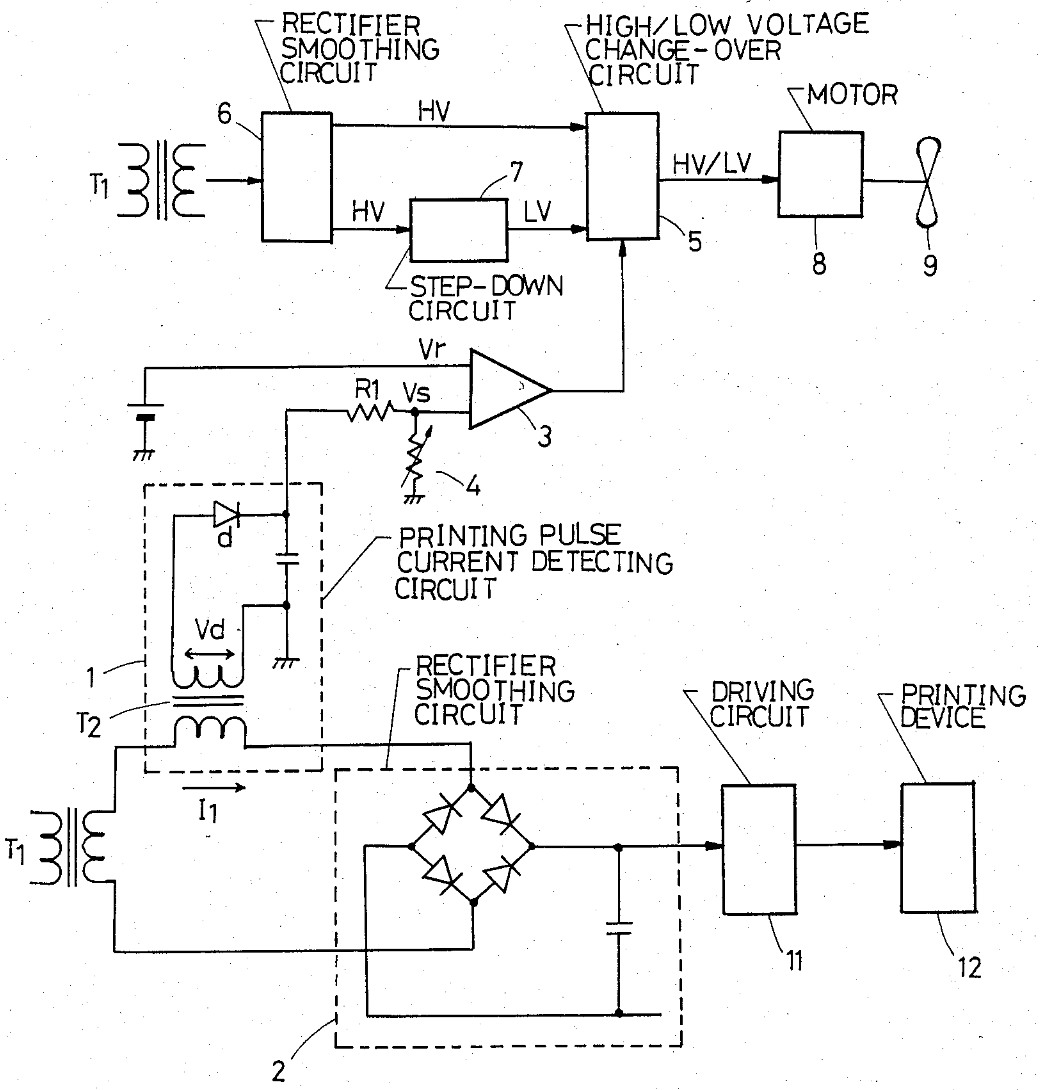
FIG. 1 is a block diagram showing a control system according to the present invention.

Referring to FIG. 1, an output from a transformer T1 is applied to a driving circuit 11 through a circuit 1 for detecting a current for printing pulses and a rectifier smoothing circuit 2, for driving a printing device 12 comprising a plurality of print hammers.

A current $I_1$ which varies according to variations in the printing rate is converted to a voltage Vd in the printing pulse current detecting circuit 1 by a transformer T2 and a diode d. The output voltage Vd is changed to a detected voltage Vs by a resistor R1 and a rheostat 4. The voltage Vs can be varied by varying the rheostat 4 to a proper value. The voltage Vs is applied to a comparator 3. When the voltage Vs becomes higher than a predetermined reference value Vr, indicating a high printing rate, the comparator 3 produces an output voltage having a high level which is applied to a HIGH/LOW voltage change-over circuit 5 comprising a semiconductor switching circuit.

On the other hand, the output of the transformer T1 is applied to a rectifier smoothing circuit 6 having two output terminals of high voltages HV. One of the high voltages HV is directly applied to the HIGH/LOW voltage change-over circuit 5 and the other HV is applied to a step-down circuit 7 where the high voltage is changed to a low voltage LV which is applied to the circuit 5. The output voltage of the circuit is applied to a motor 8 for a cooling fan 9.

When the printing rate is low and hence the printing pulse current is small, the comparator 3 produces an output voltage having a low vevel. In response to the low level voltage, the HIGH/LOW voltage change-over circuit 5 generates the low voltage LV. The low voltage is applied to the motor 8 for driving the cooling fan 9 at a low speed. When the printing rate is high and hence the printing pulse current is large, the comparator 3 produces a high level output. Thus, the circuit 5 produces the high voltage HV for driving the cooling fan at high speed so that the printing device is effectively cooled.

Figure 2:
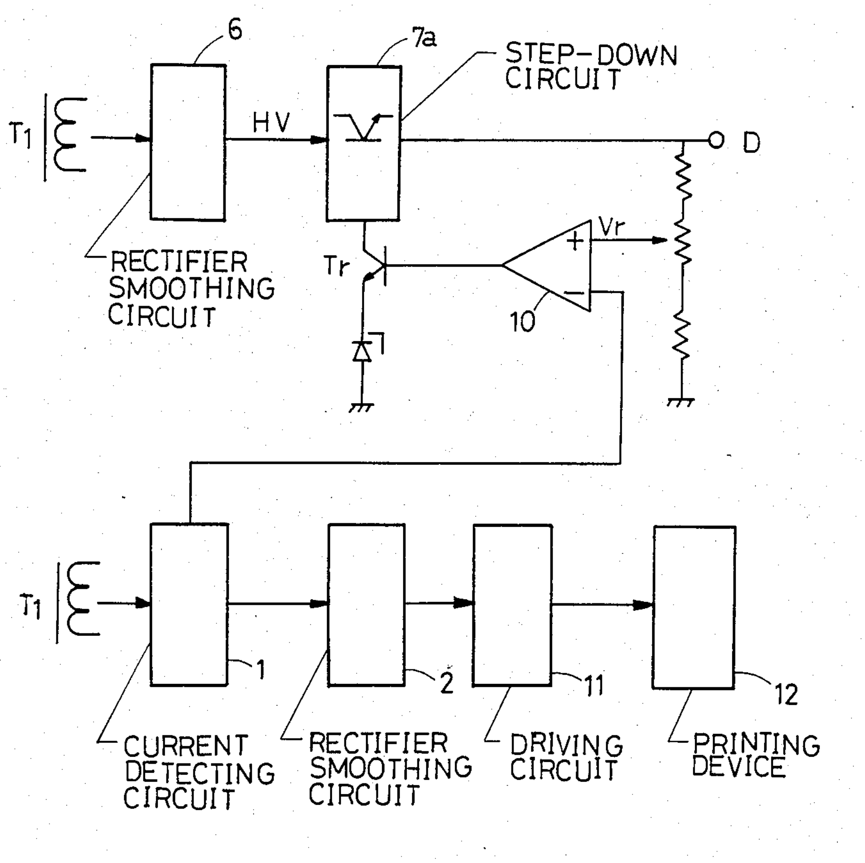
FIG. 2 is a block diagram of another embodiment of the present invention.

Referring to FIG. 2 showing another embodiment of the present invention, like parts from the system of the previous embodiment are identified with the same reference numerals of those of FIG. 1.

An output of the printing pulse current detecting circuit 1 is applied to a differential amplifier 10 the output of which is applied to a base of a transistor Tr for controlling conductivity of the transistor. The step-down circuit 7*a* of this embodiment comprises a transistor. The current passing through this transistor is controlled by the transistor Tr.

Accordingly, driving current D for the cooling fan is continuously varied in accordance with the output of the current detecting circuit 1, that is the printing rate. Thus, the cooling fan is properly driven dependent on the printing rate.

From the foregoing, it will be understood that the present invention provides a cooling fan control system for a printer which is driven in accordance with the printing rate. Therefore, useless cooling at low printing rate is avoided and the noise caused by the operation of the fan can be decreased.

While the invention has been described in conjunction with preferred specific embodiments thereof, it will be understood that this description is intended to illustrate and not limit the scope of the invention, which is defined by the following claims.

What is claimed is:

1. In a control system for an impact printer having a printing device, a driving circuit for diving the printing device, a cooling fan, and a motor for driving the cooling fan, the improvement comprising:

first means for detecting a current for driving the printing device, said current for driving being indicative of the printing rate of the printing device, and for producing an output voltage which is dependent on the current;

comparator means for comparing the output voltage of the first means with a reference value and producing a difference level which is dependent on the comparison;

second means for selectively supplying a first current, proportional to a high voltage, to the motor or a second current, proportional to a low voltage, to the motor; and change-over means, responsive to the difference signal of the comparator means, for controlling the current selected to be supplied by said second means so as to supply said first current to the motor for driving the fan when a high level difference signal is outputted from said comparator means, said high level difference signal being indicative of a high printing rate in the printing device, so as to increase the motor speed for driving the fan or to supply said second current to the motor when a low level difference signal is outputted from said comparator means said low level signal being indicative of a low printing rate in the printing device so as to decrease the motor speed for driving the fan.

2. The control system according to claim 1 wherein the first means comprises a transformer and a diode for converting the current to a voltage dependent on the current.

3. The control system according to claim 1 wherein the second means is a circuit comprising a transformer to generate a source voltage, a rectifier connected to the output of the transformer and a circuit for stepping down the rectified current.

* * * * *